United States Patent
Pierik

(10) Patent No.: US 9,523,465 B2
(45) Date of Patent: Dec. 20, 2016

(54) LUBRICATION SYSTEM THERMOSTAT, AND METHOD THEREOF

(71) Applicant: GM GLOBAL TECHNOLOGY OPERATIONS LLC, Detroit, MI (US)

(72) Inventor: Ronald J. Pierik, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 653 days.

(21) Appl. No.: 13/869,294

(22) Filed: Apr. 24, 2013

(65) Prior Publication Data
US 2014/0318640 A1     Oct. 30, 2014

(51) Int. Cl.
*F16N 25/00*    (2006.01)
*F16N 7/32*     (2006.01)

(52) U.S. Cl.
CPC ............... *F16N 25/00* (2013.01); *F16N 7/32* (2013.01); *Y10T 137/7737* (2015.04)

(58) Field of Classification Search
CPC ............... F16N 25/00; F16N 7/08; F02F 1/20
USPC ............................... 184/68; 236/101 C, 99 K
See application file for complete search history.

(56) References Cited

U.S. PATENT DOCUMENTS

| | | | | |
|---|---|---|---|---|
| 79,279 A * | 6/1868 | Taylor | .................. | F16N 7/08 184/84 |
| 180,505 A * | 8/1876 | Tyne | .................. | F16N 7/08 184/68 |
| 360,243 A * | 3/1887 | Patrick | .................. | F16N 7/08 184/65 |
| 864,991 A * | 9/1907 | Rickards | .................. | F16N 7/08 184/107 |
| 971,440 A * | 9/1910 | Grant | .................. | F16N 7/08 184/68 |
| 1,523,351 A * | 1/1925 | Schwimmer | .................. | G05D 23/125 137/468 |
| 1,674,155 A * | 6/1928 | Brown | .................. | F16N 7/08 184/68 |
| 1,700,029 A * | 1/1929 | Dady | .................. | F16K 31/0679 137/552 |

(Continued)

FOREIGN PATENT DOCUMENTS

CN     1151503 A     6/1997
CN     1312427 A     9/2001

(Continued)

*Primary Examiner* — M. Alexandra Elve
*Assistant Examiner* — Alexis Cox
(74) *Attorney, Agent, or Firm* — Quinn Law Group, PLLC

(57) ABSTRACT

A lubrication system thermostat for controlling the flow of oil in a lubrication system includes a valve and an actuator. The valve is configured to modulate between an unmodulated position and a modulated position, each of which may be in an open position or a closed position. In the open position, at least a portion of the oil flow is unobstructed, and in the closed position, the oil flow is substantially blocked. The actuator is configured to modulate the valve. The actuator includes a thermal element configured to generate mechanical displacement when subjected to a temperature change such that the valve is movable from and returnable to the unmodulated position. The lubrication system thermostat may be in a normally-open configuration, in which the unmodulated position is the open position, or a normally-closed configuration, in which the unmodulated position is the closed position.

11 Claims, 2 Drawing Sheets

(56) References Cited

U.S. PATENT DOCUMENTS

| | | | | |
|---|---|---|---|---|
| 1,842,335 | A | * | 1/1932 | Te Pas ............... F23N 5/067 236/48 R |
| 2,007,482 | A | * | 7/1935 | Stitt ..................... F16N 7/08 184/109 |
| 2,306,761 | A | * | 12/1942 | Smith ............... G05D 23/125 236/48 R |
| 2,720,889 | A | * | 10/1955 | Gothberg ............. F16N 25/00 137/262 |
| 3,935,998 | A | * | 2/1976 | Caldwell ........... G05D 23/128 236/1 C |
| 3,968,866 | A | * | 7/1976 | Leichliter .......... F16D 35/025 192/113.21 |
| 3,972,399 | A | * | 8/1976 | Bopp ................ F16D 35/025 137/79 |
| RE30,608 | E | * | 5/1981 | Bopp ................ F16D 35/025 192/58.68 |
| 4,340,172 | A | * | 7/1982 | Poore ................. F02M 31/06 123/552 |
| 2002/0148416 | A1 | * | 10/2002 | Cohen ................. F01P 7/16 123/41.1 |
| 2014/0020768 | A1 | * | 1/2014 | Doi ................... F16N 7/385 137/154 |

FOREIGN PATENT DOCUMENTS

| | | |
|---|---|---|
| CN | 2634208 Y | 8/2004 |
| CN | 1530525 | 9/2004 |
| CN | 1690600 A | 11/2005 |
| CN | 101086296 A | 12/2007 |
| CN | 101405493 A | 4/2009 |
| CN | 201266325 Y | 7/2009 |
| CN | 201539628 U | 8/2010 |
| CN | 102777758 A | 11/2012 |
| CN | 102788160 A | 11/2012 |
| WO | 2012013232 A1 | 2/2012 |

* cited by examiner

LUBRICATION SYSTEM THERMOSTAT, AND METHOD THEREOF

TECHNICAL FIELD

The present invention relates to a lubrication system thermostat, and a method thereof.

BACKGROUND

Lubrication systems are used in different applications, including, but not limited to, internal combustion engines, such as those in vehicles. In such systems, oil is distributed to lubricate different components in the engine, such as a cylinder head, a stationary hydraulic lash adjuster (SHLA), piston cooling squirters, camshaft bearings, and the like. Often, the systems implement fixed-diameter orifices in strategic locations to manage the oil flow and the pressure to the locations of these components. Also, the supply of oil to some of these components may be pressure-driven.

SUMMARY

A lubrication system thermostat for controlling the flow of oil in a lubrication system is provided. The lubrication system thermostat includes a valve and an actuator. The valve is configured to modulate between an unmodulated position and a modulated position, each being one of an open position and a closed position. In the open position, at least a portion of the flow of oil is unobstructed. In the closed position, the flow of oil is substantially blocked.

The actuator is configured to modulate the valve between the unmodulated position and the modulated position. The actuator has a thermal element configured to generate mechanical displacement when subjected to a temperature change such that the valve is movable from and returnable to the unmodulated position. In one embodiment, the thermal element may be a thermostatic wax. The thermostatic wax may be configured to expand when heated from a solid state to a liquid state such that the valve is movable from the unmodulated position. The thermostatic wax may also be configured to contract when cooled from the liquid state to the solid state such that the valve is returnable to the unmodulated position.

The lubrication system thermostat may be in one of a normally-open configuration and a normally-closed configuration. In the normally-open configuration, the unmodulated position of the valve is the open position. In the normally-closed configuration, the unmodulated position of the valve is the closed position.

The lubrication system thermostat may also include a casing defining an internal chamber within which the valve and the actuator are substantially disposed. The casing may have an oil inlet and an oil outlet through which the oil enters and exits the internal chamber. The lubrication system thermostat may further include an orifice plate within the internal chamber that divides the internal chamber into an inlet chamber and an outlet chamber. The orifice plate may have an orifice through which the oil is flowable from the inlet chamber to the outlet chamber. In such an embodiment, the valve is configured to engage with the orifice to control the flow of oil from the inlet chamber to the outlet chamber.

A method for controlling the flow of oil in a lubrication system is also provided. The method utilizes the lubrication system thermostat described above. The method includes first heating the thermal element such that it generates mechanical displacement. The method then includes moving, by the thermal element, the valve from an unmodulated position. As explained above, the unmodulated position may be one of an open position, in which at least a portion of the flow of oil is unobstructed, and a closed position, in which the flow of oil is substantially blocked.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Figure 1A:
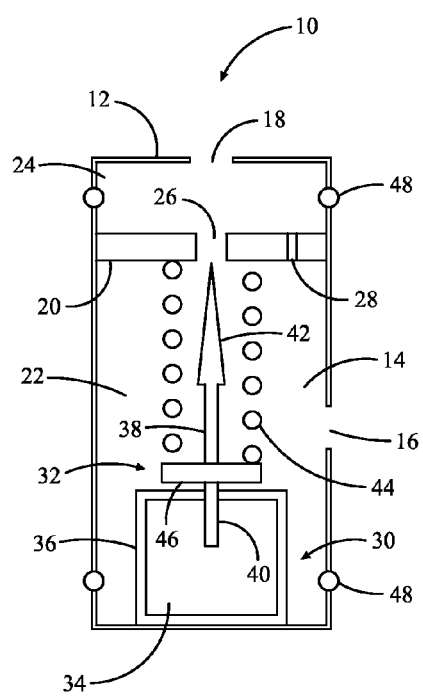
FIGS. 1A and 1B are schematic, cross-sectional views of a lubrication system thermostat in a normally-open configuration having a valve in an unmodulated position and in a modulated position, respectively.
Figure 1B:
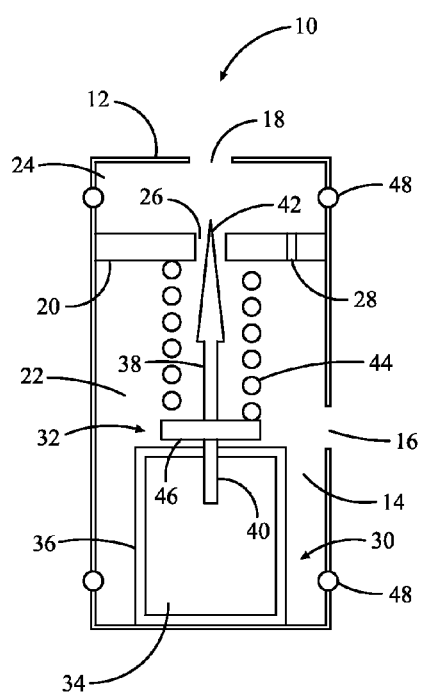
Figure 2A:
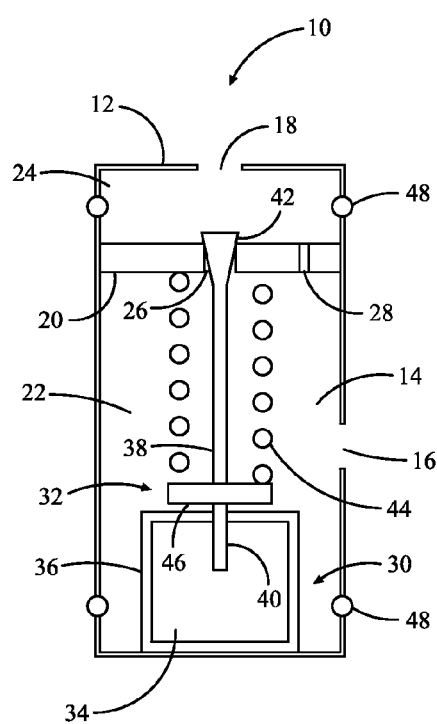
FIGS. 2A and 2B are schematic, cross-sectional views of a lubrication system thermostat in a normally-closed configuration having a valve in an unmodulated position and in a modulated position, respectively.
Figure 2B:
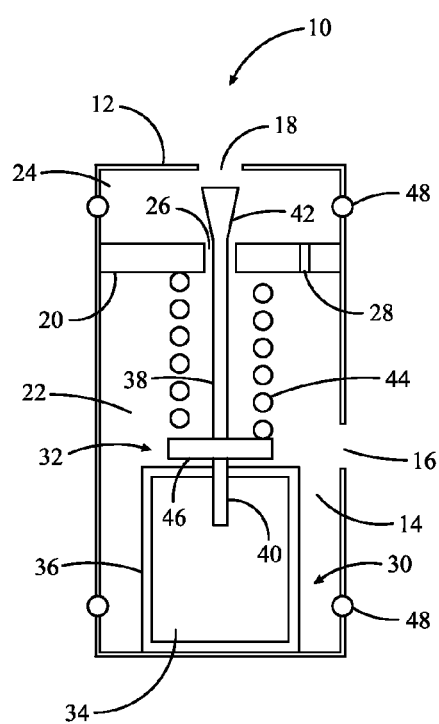

Referring to the drawings, wherein like reference numbers correspond to like or similar components wherever possible throughout the several figures, a lubrication system thermostat 10 is shown. The lubrication system thermostat 10 generally controls the flow of oil to a specific location or component in a lubrication system (not shown), such as in an internal combustion engine, and operates based on the temperature of the oil. As described in more detail hereinafter, the lubrication system thermostat 10 may be in a normally-open configuration, as depicted in FIGS. 1A and 1B, or a normally-closed configuration, as depicted in FIGS. 2A and 2B.

The desired oil flow to a specific location or component in the lubrication system may vary depending upon the temperature of the oil at a given time. The relationship between the desired oil flow and the oil temperature may determine the configuration of the lubrication system thermostat 10 at that location. In some locations, such as at the cylinder head cam bearings of an internal combustion engine, it may be desirable to decrease the oil flow as the temperature of the oil increases and the viscosity of the oil decreases. In such locations, the lubrication system thermostat 10 may be in the normally-open configuration in which it is configured to reduce the oil flow as the oil temperature increases, as described in more detail hereinafter.

Conversely, in other locations where a low amount of oil or no oil at all may be required at low oil temperatures, such as at piston cooling squirters in an internal combustion engine, it may be desirable to increase the oil flow as the oil temperature increases. In such locations, the lubrication system thermostat 10 may be in the normally-closed configuration in which it is configured to open and/or increase the oil flow as the oil temperature increases.

The lubrication system thermostat 10 generally includes an actuator 30 and a valve 32 connected to the actuator 30. The actuator 30 generally includes a thermal element 34 that is configured to generate mechanical displacement when it is subjected to a temperature change. In one embodiment, the thermal element 34 may be a thermostatic wax that expands when it is heated from a solid state to a liquid state, i.e., when it is melted, as depicted in the figures. In another embodiment not shown, the thermal element 34 may be a bi-metal strip or any other material that may change a preloaded force and stiffness as a result of temperature changes.

The changing of temperature of the thermal element 34 may be accomplished passively by circulating the oil such that it comes into contact with the thermal element 34. When the oil heats up or cools down, it in turn may heat or cool the thermal element 34 above or below a threshold temperature at which mechanical displacement occurs. For example, in embodiments in which the thermal element 34 is a thermostatic wax, the thermostatic wax may begin to melt and expand when the oil heats the thermostatic wax above its melting temperature. The temperature at which this occurs, as well as the amount of expansion of the thermostatic wax, is dependent upon the make-up of the thermostatic wax, which in turn may be dependent upon the intended temperature of the oil in the lubrication system. In such embodiments, the actuator 30 also may include an enclosure 36 around the thermostatic wax that may serve to guide the expansion of the thermostatic wax in a controlled manner, as well as to serve as a conductor of heat between the oil and the thermostatic wax.

In other embodiments, the changing of temperature of the thermal element 34 may be accomplished actively via an electrical coil or other heating/cooling element (not shown) that may be activated by a controller or other computer (not shown).

The valve 32 generally is any device configured to control the oil flow. The valve 32 is configured to be modulated between an unmodulated position, as shown in FIGS. 1A and 2A, and a modulated position, as shown in FIGS. 1B and 2B, either of which may be any position between a fully open position and a closed position. In the fully open position, the full flow of oil is unobstructed and allowed to flow at the specific location in the lubrication system. Conversely, in the closed position, the flow of oil is substantially blocked. The unmodulated position is determined by the configuration of the lubrication system thermostat 10, as described above.

When the lubrication system thermostat 10 is in a normally-open configuration, the unmodulated position of the valve 32 is an open position, including the fully open position, in which at least a portion of the flow is unobstructed. As such, the valve 32 may be modulated from the unmodulated position to reduce the flow of oil, as described hereinafter. Conversely, when the lubrication system thermostat 10 is in a normally-closed configuration, the unmodulated position of the valve 32 is the closed position, and the valve 32 may be modulated from the unmodulated position to open the flow of oil.

The actuator 30 is configured to modulate the position of the valve 32. When the thermal element 34 of the actuator 30 generates mechanical displacement, as explained above, the valve 32 is modulated to adjust the flow of oil based on the temperature of the oil.

The valve 32 may include a stem 38 that has a proximate end 40 and a distal end 42. The proximate end 40 may be attached to the actuator 30 such that the stem 38 moves axially when the thermal element 34 generates mechanical displacement. The proximate end 40 may be integrated with the thermal element 34, as depicted in the figures, such that the stem 38 may be moved directly by the thermal element 34. In embodiments in which the thermal element 34 is a thermostatic wax and includes an enclosure 36, as explained above, the enclosure 36 may be made of an expandable material such that it expands and contracts with the thermostatic wax. The proximate end 40 may be attached directly to the enclosure 36 such that the stem 38 may be moved when the thermostatic wax expands and contracts.

The distal end 42 may be configured to substantially block the flow of oil when the valve 32 is in the closed position. Generally, the distal end 42 may be configured to fit within an opening through which the oil flows in the lubrication system. The opening may be found directly in the lubrication system, such as in an engine block or a cylinder head. The opening may also be in a casing 12, as described in more detail hereinafter, or may be an orifice 26 of an orifice plate 20, as seen in the figures and also described in more detail hereinafter.

The distal end 42 may be tapered such that it may allow for variable flow through the opening (the orifice 26 and/or the oil outlet 18) as the stem 38 is moving axially. The direction of the taper depends upon the configuration of the lubrication system thermostat 10. Specifically, when the lubrication system thermostat 10 is in the normally-open configuration, the distal end 42 is tapered away from the proximate end 40 (i.e., the wider portion is closer to the proximate end 40), as seen in FIGS. 1A and 1B. Conversely, when the lubrication system thermostat 10 is in the normally-closed configuration, the distal end 42 is tapered toward the proximate end 40 (i.e., the wider portion is further from the proximate end 40), as seen in FIGS. 2A and 2B.

As mentioned above, the lubrication system thermostat 10 also may include a casing 12. The casing 12 defines an internal chamber 14 in which the actuator 30 and the valve 32 may be located. The casing 12 has an oil inlet 16 and an oil outlet 18 through which the oil enters and exits the internal chamber 14, respectively. It should be appreciated that the oil may enter the internal chamber 14 through the oil outlet 18, and exit the internal chamber 14 through the oil inlet 16, depending upon the location of the lubrication system thermostat 10 in the lubrication system.

Also as mentioned above, the lubrication system thermostat 10 further may include an orifice plate 20 that divides the internal chamber 14 into an inlet chamber 22 and an outlet chamber 24. The actuator 30 and the valve 32 may be located substantially within the inlet chamber 22. The orifice plate 20 allows the lubrication system thermostat 10 to be packaged as a cartridge with no significantly protruding parts, while maintaining its functionality, as described hereinafter. In such an embodiment, the oil inlet 16 opens into the inlet chamber 22, and the oil outlet 18 opens from the outlet chamber 24. The orifice plate 20 includes an orifice 26 through which the oil flows from the inlet chamber 22 to the outlet chamber 24.

The lubrication system thermostat 10 also may include a vent 28 for drawing oil into the internal chamber 14 and/or the inlet chamber 22, as well as for bleeding air out of the lubrication system. The vent 28 may be located in the orifice plate 20, the casing 12, or directly in the component of the lubrication system to which oil is being supplied, such as the engine block. This may allow a minimum amount of oil flow to bypass the valve 32 when it is in the closed position such that components within the lubrication system may still receive a minimum amount of oil to prevent significant wear or damage to those components.

The lubrication system thermostat 10 may also include a spring 44 to further the returning of the valve 32 to the unmodulated position, as explained above. The spring 44 generally is in a preloaded state, in which it has a preload or minimum force, when the valve 32 is in the unmodulated position. The spring 44 is configured to compress from and expand to the preloaded state when the thermal element 34 generates mechanical displacement. One end of the spring 44 may be attached to the valve 42. The other end of the spring 44 may be attached directly to a component within the lubrication system, such as the engine block, or may be attached to the casing 12 and/or the orifice plate 20 in embodiments in which the lubrication system thermostat 10 includes them. The valve 32 may include a platform 46 to which the spring 44 may be attached to further the compressing and expanding of the spring 44.

The lubrication system thermostat 10 also may include seals 48 around at least a portion of the casing 12. The seals 48 are configured to prevent leaking of the oil when the lubrication system thermostat 10 is implemented in the lubrication system. The seals 48 may be, but are not limited to, O-ring type seals.

Figure 3:
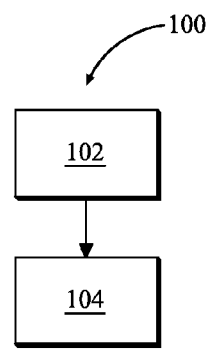
FIG. 3 is a schematic flow diagram illustrating a method of controlling oil flow in a lubrication system.

Referring now to FIG. 3, a method 100 for controlling the flow of oil in a lubrication system is shown. Method 100 begins at step 102 in which the thermal element 34 is heated such that it generates mechanical displacement. This may include circulating the oil such that it is in contact with the thermal element 34, and then heating the oil such that it, in turn, heats the thermal element 34. For example, in embodiments in which the thermal element 34 is a thermostatic wax, the oil may be heated until the thermostatic wax is heated above its melting temperature such that it begins to expand, as explained above.

In the normally-open configuration, at least a portion of the flow of oil will be unobstructed, such as in the embodiment depicted in FIG. 1A in which the oil is allowed to flow through the orifice 26 and the oil outlet 18. In the normally-closed configuration, the flow of oil will be substantially blocked, as seen in FIG. 2A.

After step 102, method 100 proceeds to step 104. At step 104, the thermal element 34 moves the valve 32 from the unmodulated position. In the normally-open configuration, the valve 32 will be moved such that the oil flow will begin to be reduced, as seen in FIG. 1B. After displacement generated by the thermal element 34 is complete, the oil flow may be merely reduced or substantially blocked, depending upon the oil demands at the location within the lubrication system at the increased oil temperature. In the normally-closed configuration, the valve 32 will be moved such that the oil flow will be allowed, as seen in FIG. 2B.

Method 100 may further include cooling the thermal element 34 such that the valve 32 is substantially returned to the unmodulated position. As explained above, the lubrication thermostat 10 may include a spring 44 to further the returning of the valve 32 to the unmodulated position.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A lubrication system thermostat for controlling the flow of oil in a lubrication system, the lubrication system thermostat comprising:
   a valve being configured to modulate between an unmodulated position and a modulated position, the unmodulated position and the modulated position each being one of an open position, in which at least a portion of the flow of oil is unobstructed, and a closed position, in which the flow of oil is substantially blocked;
   an actuator configured to modulate the valve between the unmodulated position and the modulated position, the actuator having a thermal element configured to generate mechanical displacement when subjected to a temperature change such that the valve is movable from and returnable to the unmodulated position;
   a casing defining an internal chamber within which the valve and the actuator are substantially disposed, wherein the casing has an oil inlet and an oil outlet through which the oil enters and exists the internal chamber;
   wherein the lubrication system thermostat is in one of a normally-open configuration, in which the unmodulated position of the valve is the open position, and a normally-closed configuration, in which the unmodulated position of the valve is the closed position;
   wherein the thermal element of the actuator is a thermostatic wax configured to expand when heated from a solid state to a liquid state such that the valve is movable from the unmodulated position, and to contract when cooled from the liquid state to the solid state such that the valve is returnable to the unmodulated position;
   an enclosure surrounding the thermostatic wax such that the enclosure guides the expansion of the thermostatic wax in a controlled manner, wherein the enclosure is in thermal communication with the thermostatic wax such as to serve as a conductor of heat between the oil and the thermostatic wax, and the enclosure is made of an expandable material such that the enclosure expands and contracts with the thermostatic wax; and
   an orifice plate dividing the internal chamber into an inlet chamber and an outlet chamber, the orifice plate comprising a vent and an orifice through which the oil is flowable from the inlet chamber to the outlet chamber.

2. The lubrication system thermostat of claim 1, wherein the valve is configured to engage with the orifice to control the flow of oil from the inlet chamber to the outlet chamber.

3. The lubrication system thermostat of claim 1, further comprising at least one seal around at least a portion of the casing.

4. The lubrication system thermostat of claim 1 wherein the valve comprises a stem with a proximate end and a distal end, the proximate end being attached to the actuator such that the stem moves axially when the thermal element generates mechanical displacement, and the distal end being configured to substantially block the flow of oil when the valve is in the closed position.

5. The lubrication system thermostat of claim 2 wherein the valve includes a stem, the stem has a distal end and a proximate end, the distal end of the stem is tapered such that the valve allows for a variable flow past the lubrication system thermostat as the stem moves axially, the distal end is tapered away from the proximate end in the normally-open configuration, and toward the proximate end in the normally-closed configuration.

6. The lubrication system thermostat of claim 1 further comprising a spring attached to the valve, the spring being in a preloaded state when the valve is in the unmodulated position, the spring being configured to compress from and to expand to the preloaded state such that the valve is further returnable to the unmodulated position from the modulated position.

7. The lubrication system thermostat of claim 1 further comprising a vent.

8. A lubrication system thermostat comprising:
a casing defining an internal chamber, the casing having an oil inlet and an oil outlet through which oil enters and exits the internal chamber;
an orifice plate dividing the internal chamber into an inlet chamber and an outlet chamber, the orifice plate comprising a vent and an orifice through which the oil is flowable from the inlet chamber to the outlet chamber;
a valve configured to control the oil flowing from the inlet chamber to the outlet chamber, the valve being movable from and returnable to an unmodulated position, the valve having a stem with a proximate end and a distal end, the distal end being configured to fit within the orifice of the orifice plate;
an actuator to which the proximate end of the stem of the valve is attached, the actuator having a thermostatic wax configured to expand when heated from a solid to a liquid such that the valve is movable from the unmodulated position, and to contract when cooled from the liquid state to the solid state such that the valve is returnable to the unmodulated position;
wherein the unmodulated position of the valve is one of an open position, in which the flow of oil is allowed to exit the internal chamber, and a closed position, in which the flow of oil is substantially blocked from exiting the internal chamber;
wherein the lubrication system thermostat is in one of a normally-open configuration, in which the unmodulated position of the valve is the open position, and a normally-closed configuration, in which the unmodulated position of the valve is the closed position; and
an enclosure surrounding the thermostatic wax such that the enclosure guides the expansion of the thermostatic wax in a controlled manner, wherein the enclosure is in thermal communication with the thermostatic wax such as to serve as a conductor of heat between the oil and the thermostatic wax, and the enclosure is made of an expandable material such that the enclosure expands and contracts with the thermostatic wax.

9. The lubrication system thermostat of claim 8 wherein the distal end of the stem is tapered such that it allows for a variable flow of the oil exiting the internal chamber as the stem moves axially, the distal end being tapered away from the proximate end in the normally-open configuration, and toward the proximate end in the normally-closed configuration.

10. The lubrication system thermostat of claim 8 further comprising a spring attached to the valve, the spring being in a preloaded state when the valve is in the unmodulated position, the spring being configured to compress from and to expand to the preloaded state such that the valve is further returnable to the unmodulated position.

11. The lubrication system thermostat of claim 8 further comprising at least one seal around at least a portion of the casing.

* * * * *